(12) United States Patent
    Abhishek et al.

(10) Patent No.: US 10,210,557 B2
(45) Date of Patent: Feb. 19, 2019

(54) SYSTEM, METHOD, AND NON-TRANSITORY COMPUTER-READABLE STORAGE MEDIA FOR DISPLAYING PRODUCT INFORMATION ON WEBSITES

(71) Applicant: Wal-Mart Stores, Inc., Bentonville, AR (US)

(72) Inventors: Vineet Abhishek, Mountain View, CA (US); Manas A. Pathak, Sunnyvale, CA (US); Onur Gungor, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 484 days.

(21) Appl. No.: 14/925,836

(22) Filed: Oct. 28, 2015

(65) Prior Publication Data

US 2017/0124619 A1   May 4, 2017

(51) Int. Cl.
    *G06Q 30/00* (2012.01)
    *G06F 17/30* (2006.01)
    *G06Q 30/06* (2012.01)

(52) U.S. Cl.
    CPC ... *G06Q 30/0625* (2013.01); *G06F 17/30442* (2013.01); *G06F 17/30554* (2013.01); *G06F 17/30864* (2013.01); *G06F 17/30867* (2013.01); *G06Q 30/0627* (2013.01); *G06Q 30/0629* (2013.01); *G06Q 30/0633* (2013.01)

(58) Field of Classification Search
    CPC .......... G06Q 30/06; G06Q 30/0601–30/0643; G06Q 30/08; G06F 17/30; G06F 17/30386; G06F 17/30424; G06F 17/30442; G06F 17/30554; G06F 17/30861; G06F 17/30864; G06F 17/0269
    See application file for complete search history.

(56) References Cited

U.S. PATENT DOCUMENTS

| 2014/0282153 A1* | 9/2014 | Christiansen ...... G06Q 30/0201 715/765 |
| 2015/0287119 A1* | 10/2015 | Bhan .................. G06Q 30/0629 705/5 |
| 2016/0125498 A1* | 5/2016 | Setty .................. G06Q 30/0627 705/26.63 |
| 2016/0140241 A1* | 5/2016 | Weyerhaeuser .. G06F 17/30867 707/710 |
| 2016/0203540 A1* | 7/2016 | Shi ..................... G06Q 30/0625 705/26.62 |

(Continued)

OTHER PUBLICATIONS

Faceted Classification for the Web. Axiomathes. Jun. 2008, vol. 18, Issue 2, pp. 145-160. Brian Vickery. (Year: 2008).*

(Continued)

*Primary Examiner* — William J Allen
(74) *Attorney, Agent, or Firm* — Bryan Cave Leighton Paisner LLP (57) ABSTRACT

A system, method and computer product for displaying product information is described herein. Facet values that may cause bad customer experience(s) are identified and suppressed. The system, method, and computer product may use a randomization scheme to suppress and/or show "bad" facet values occasionally to gather recent data on the facet values have improved. The suppression process works as a robust noise filter on top of the search and browse faceting experience.

26 Claims, 6 Drawing Sheets

(56) References Cited

U.S. PATENT DOCUMENTS

2017/0091325 A1\* 3/2017 Berentsen ......... G06F 17/30864

OTHER PUBLICATIONS

U.S. Appl. No. 14/633,022, filed Feb. 26, 2015 entitled "System, Method, and Non-Transitory Computer-Readable Storage Media for Displaying Product Information on Websites".
U.S. Appl. No. 14/671,817, filed Mar. 27, 2015 entitled "System, Method, and Non-Transitory Computer-Readable Storage Media for Displaying Product Information on Websites".

\* cited by examiner

SYSTEM, METHOD, AND NON-TRANSITORY COMPUTER-READABLE STORAGE MEDIA FOR DISPLAYING PRODUCT INFORMATION ON WEBSITES

FIELD OF THE DISCLOSURE

The present invention relates to providing product information to a consumer, and more particularly, to systems, methods, and computer-readable storage media that generates and displays product information and related filtered facet values, via a website or application in response to a consumer's product search request. The suggested class/subclass of the disclosure is: CLASS 707/722 (DATA PROCESSING: DATABASE, DATA MINING, AND FILE MANAGEMENT OR DATA STRUCTURES/Post processing of search results) and the suggested Art Unit is 2161.

BACKGROUND

Many consumers desire to order items, goods, or products remotely, e.g., on-line, through the Internet, or using a specially designed application or app on a personal computer or mobile device, such as a tablet or cell phone. At least some known web hosting systems include search engines that allow consumers to enter search criteria and generate search results based on the consumer's search criteria. Known search engines may generate and display product lists to consumers via a website including products that are selected based on the search criteria.

Along with the complete search results, known search engines may also include one or more categories or facets associated with the items, goods, or products in the search results. Each facet may include one or more values. Typically, the customer can select one or more values in the categories, in an effort to narrow the search results and provide more relevant products in the search results. For example, common categories may include the manufacturer or brand of the goods, color of the goods, gender (of the intended user), and/or size. By selecting one or more of the values in the categories, the customer may narrow the search results.

However, in some instances the categories displayed to the customer may not be relevant to the customer's search query, and thus, the customer experience may be degraded. The present invention is aimed at one or more of the problems identified above.

SUMMARY OF THE INVENTION

In different embodiments of the present invention, systems, methods, and computer-readable storage media allow users to display relevant product information to a consumer via a commercial order module, such as a website or application (or "app") running a customer's device, such as a computer or mobile device.

In one embodiment of the present invention, a system is provided. The system includes a memory unit, an order unit, a search engine unit, and a facet cleaner unit. The memory device is configured to store product data associated with a plurality of products, to store historical usage information related to usage of a commercial order module by a plurality of customers, and to store a plurality of categories associated with the plurality of products, each facet having a plurality of facet values. At least one statistical model is established as a function of the historical usage information. The order unit is coupled to the memory device and is configured to generate the commercial product module. The commercial product module is sent over a computer network to, and viewable by a customer on, a customer device and allows the customer to enter a product search request via the commercial product module. The search engine unit is coupled to the memory device and the order unit and is configured to receive the product search request from the order unit, and to receive, from the memory device, search results data associated with the product search request. The search results data include a subset of the plurality of products and at least one facet associated with the product search request. The facet cleaner unit is coupled to the memory device, the order unit, and the search engine unit and is configured to receive the search results data and to filter the search results data based on the at least one statistical model to remove irrelevant facet values from the search results data and to responsively establish filtered search results data. The order unit is further configured to send the filtered search results data to the commercial product module over the computer network.

In another embodiment of the present invention, a method is provided. In a first step, product data associated with a plurality of products, historical usage information related to usage of a commercial order module by a plurality of customers, and a plurality of facets associated with the plurality of products is stored on a memory device. Each facet has a plurality of facet values. In a second step, at least one statistical model as a function of the historical usage information is established. In a third step, the commercial order module is generated and sent over a computer network to a customer device. The computer product module is viewable by a customer and configured to allow the customer to enter a product search request via the commercial product module. In a fourth step, the product search request is received, at a search engine unit, and search results data associated with the product search request are received from the memory unit. The search results data include a subset of the plurality of products and at least one facet associated with the product search request. In a fifth step, the search results data are received at a facet cleaner unit coupled to the memory device, the order unit, and the search engine unit. In a sixth step, the search results data is filtered based on the at least one statistical model to remove irrelevant facet values from the search results data and filtered search results data are responsively established. In a seventh step, the filtered search results data are sent to the commercial product module over the computer network.

In still another embodiment of the present invention, one or more non-transitory computer-readable storage media, having computer-executable instructions embodied thereon, wherein when executed by at least one processor, the computer-executable instructions cause the processor to operate as a memory unit, an order unit, a search engine unit, and a facet cleaner unit. The memory device is configured to store product data associated with a plurality of products, to store historical usage information related to usage of a commercial order module by a plurality of customers, and to store a plurality of facets associated with the plurality of products, each facet having a plurality of facet values. At least one statistical model is established as a function of the historical usage information. The order unit is coupled to the memory device and is configured to generate the commercial product module. The commercial product module is sent over a computer network to, and viewable by a customer on, a customer device and allows the customer to enter a product search request via the commercial product module. The search engine unit is coupled to the memory device and the order unit and is configured to receive the product search request from the order unit, and to receive, from the memory device, search results data associated with the product search request. The search results data include a subset of the plurality of products and at least one facet associated with the product search request. The facet cleaner unit is coupled to the memory device, the order unit, and the search engine unit and is configured to receive the search results data and to filter the search results data based on the at least one statistical model to remove irrelevant facet values from the search results data and to responsively establish filtered search results data. The order unit is further configured to send the filtered search results data to the commercial product module over the computer network.

In still a further embodiment of the present invention, a system including memory means, modeling means, order means, search engine means, and facet cleaner means is provided. The memory means stores product data associated with a plurality of products, historical usage information related to usage of a commercial order module by a plurality of customers, and stores a plurality of facets associated with the plurality of product. Each facet has a plurality of facet values. The modeling means provides at least one statistical model established as a function of the historical usage information. The order means is coupled to the memory means and generates the commercial product module. The commercial product module is sent over a computer network to, and viewable by a customer on, a customer device. The order means allows the customer to enter a product search request via the commercial product module. The search engine means receives the product search request from the order unit and receives search results data associated with the product search request. The search results data includes a subset of the plurality of products and at least one facet associated with the product search request. The facet cleaner means unit receives the search results data, filters the search results data based on the at least one statistical model to remove irrelevant facet values from the search results data and responsively establishes filtered search results data. The order means includes means for sending the filtered search results data to the commercial product module over the computer network.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIG. 5 is an illustration of an exemplary screenshot from the system of FIG. 1, according to an embodiment of the present invention;

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Figure 1:
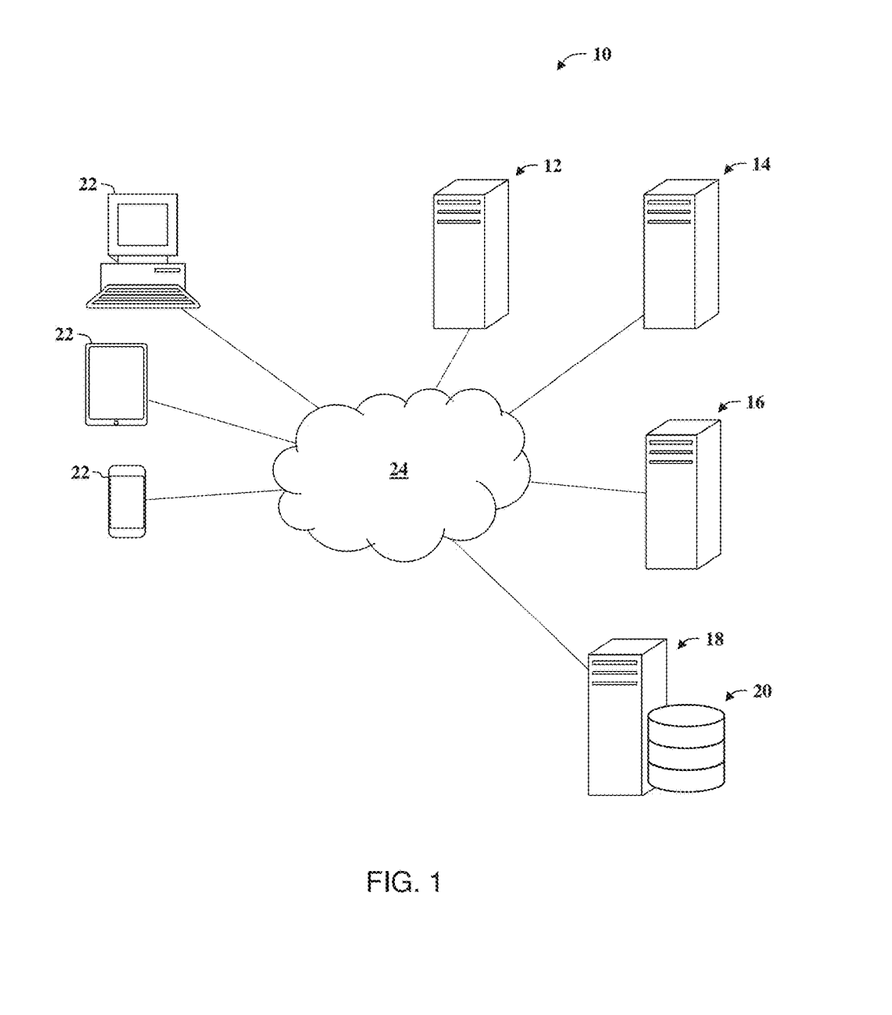
FIG. 1 is a schematic illustrating various aspects of a system, according to the present disclosure.

With reference to the FIGS. and in operation, the present invention provides a system 10, methods and computer product media that facilitates displaying product information to a user via a commercial product module 44, such as a website or an application, i.e., "app", running on a user device. Referring to FIG. 1, an exemplary environment in which the system 10 operates is illustrated. In the illustrated embodiment, the system 10 is configured to enable a user or customer to access a website with one or more user computing devices to view information indicative of products that may be purchase by the user via the commercial product module 44. In general, the system 10 generates and displays product lists in response to receiving a product search request from a consumer via a commercial product module 44. The system 10 generates search data including a plurality of product records as a function of the search request, and analyses the search data and generates sorted groups of product records based on one or more data categories included in the product records. The system 10 generates and displays faceted information of the search results to provide additional information that is relevant to the consumer's search request. It should be noted that a product search request may take many different forms. For example, a product search request may include a search performed in response to the user entering key words that describe a product for which the customer may be looking. The product search request may also be initiated through a browser or browsing session in which the customer clicks or selects through a series of navigational links to arrive at the desired product.

The disclosure particularly describes how product information may be displayed via a commercial product module 44, such as a website or application (or "app") on customer device, to a consumer to increase the likelihood that the products displayed in the search results are relevant to the customer. By suppressing categories or facets that include facet values that are associated with products (for a particular search) that are not relevant to the customer, a bad customer experience may be avoided, thus potentially increasing a conversion rate of the corresponding commercial product module 44.

For example, in one embodiment, the system may generate search data including a plurality of product records associated with a search request received from a customer. Generally, such a search request may include a search of hundreds, if not thousands, of products. In order to provide additional information that the customer may use to narrow the search criteria and to reduce the number of products within the search results in order to produce search results that include products that are more relevant to the customer. In one embodiment, the search results may include one or more facet with a list of facet values. For example, one typical categories may include (1) the manufacturer or brand of the goods, (2) color of the goods, (3) gender (of the intended user), (4) size, and/or (5) price. One other facet may be "Category" which may include, e.g., types of goods that potentially meet the search criteria. The categories, which may also be known as "facets" are established based on the search criteria and/or products in the search results.

Figure 6:
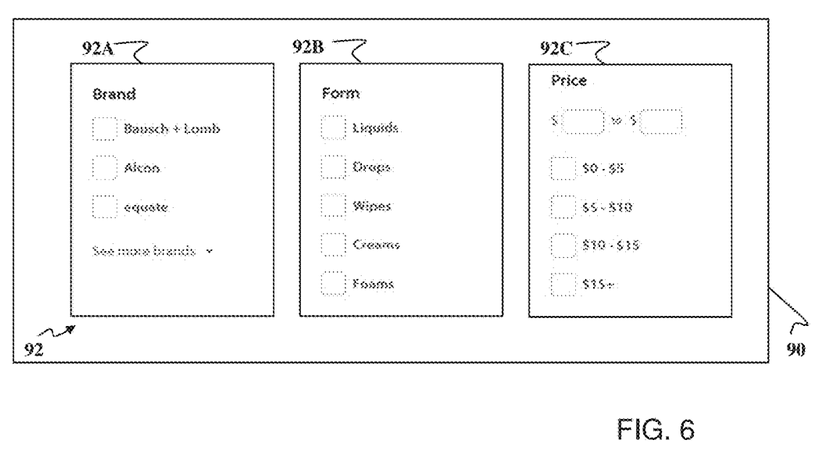
FIG. 6 is a diagrammatic illustration of exemplary categories or facets, according to an embodiment of the present invention.

However, since the initial search results may include hundreds, if not thousands, of products, a product search request may result in one or more categories that are not relevant to the customer's needs or the product(s) for which the customer is looking. By selecting an irrelevant facet value, products in which the customer is not interested may be displayed. The present invention is aimed at reducing or eliminating irrelevant facet values from being displayed. Several hypothetical facets on a portion of an exemplary commercial product module 44 are shown for an exemplary product search for "contact lens" are shown in FIG. 6. Alongside a listing of initial search results (not shown), several facets 92 may be displayed. In the illustrated example, a Brand facet 9A, a Form Facet 92B, and a Price Facet 92C are shown. Each facet 92 may have one or more facet values. In the illustrated embodiment, each facet value has an associated click box. Selection of the associated click box by the customer will narrow the displayed search results to those products associated with the selected facet value(s).

In addition, by generating the filtered category or facet values, the system 10 improves the speed and functionality of known computing systems by reducing the amount of irrelevant information being displayed in response to a user's search request, thus reducing the computing resources required to generate and display relevant search results.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media. An apparatus may be expressed in terms of modules and/or units that include one or more discrete hardware components or portions thereof as configured by software (in any form). Furthermore, an apparatus may take the form of one or more elements expressed as a means for performing a specified function. When expressed in such a form, the means are to be interpreted as meaning the combination of hardware components or portions thereof contained within this specification, and any equivalents thereof.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with".

This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a hosting server 12, a search engine server 14, a sorting server 16, a database server 18, a database 20, and one or more user computing (or customer) devices 22 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like.

The database server 18 includes a memory device that is connected to the database 20 to retrieve and store information contained in the database 20. The database 20 contains information on a variety of matters, such as, for example, web pages associated with one or more websites, customer account information, product records, data categories, facet values, sorted data groups, and/or any suitable information that enables the system 10 to function as described herein.

Figure 4:
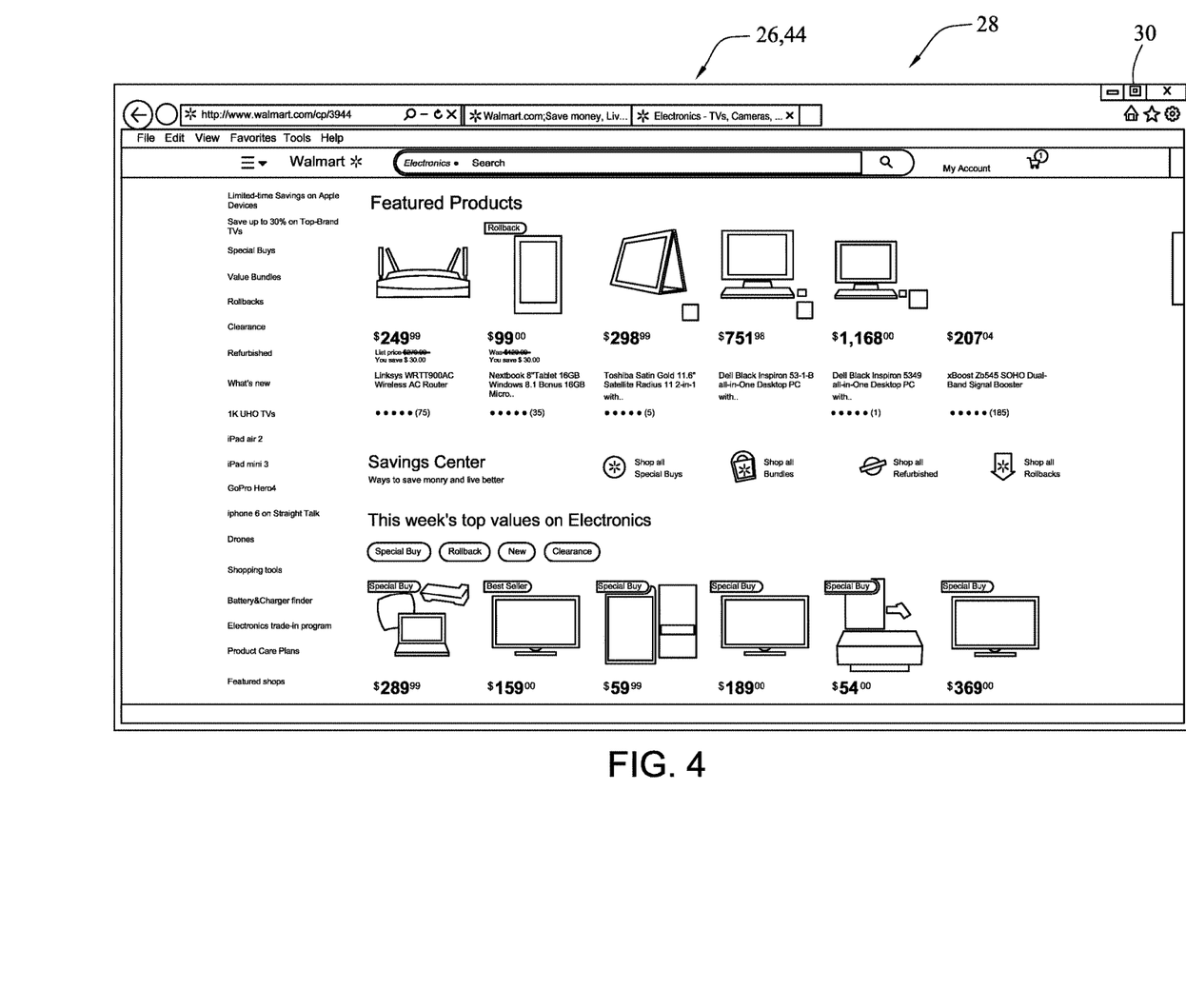
FIG. 4 is an illustration of an exemplary screenshot from the system of FIG. 1, according to an embodiment of the present invention.

The hosting server 12 may be configured to host a website 26 or provide data to the app that is accessible by a user via one or more user computing devices 22. For example, the hosting server 12 may retrieve and store web pages 28 (shown in FIGS. 4 and 5) associated with one or more websites 26 in response to requests received by the user via the user computing device 22 to allow users to interact with the website and search and/or purchase products such as, for example, goods and/or services via the website. In one embodiment, the hosting server 12 is configured to generate and display web pages 28 associated with the website in response to requests being received from consumers via corresponding web browsers that are displayed on the user computing devices 22. For example, in one embodiment, the hosting server 12 may display a product search webpage 30 (shown in FIG. 4) in response to receiving a user request that allows a user to input a product search request including search criteria including one or more search terms. In addition, the hosting server 12 may transmit the product search request to the search engine server 14 and/or the sorting server 16 for use in generating search data and/or product lists in response to the user's search request. The hosting server 12 may also receive one or more product lists 32 (shown in FIG. 5) from the search engine server 14 and/or the sorting server 16 that includes information associated with products that are selected based on the user's search criteria. The hosting server 12 may also display a search results webpage 34 to display the product lists 32 to the user and to allow the user to select one or more of the displayed products for purchase.

In the illustrated embodiment, the search engine server 14 is configured to receive a product search request from the hosting server 12 including one or more search terms, and generate search data including a plurality of product records as a function of the search terms. For example, in one embodiment, the search engine server 14 may initiate a search algorithm based on a Boolean model to search product records contained in the database 20 based search terms received from the user. One system that provides a suitable system 10, including a search engine server 14 is disclosed in U.S. patent application Ser. No. 14/633,022, filed on Feb. 26, 2015 and U.S. patent application Ser. No. 14/671,817, filed on Mar. 27, 2015, which are hereby incorporated by reference.

Figure 2:
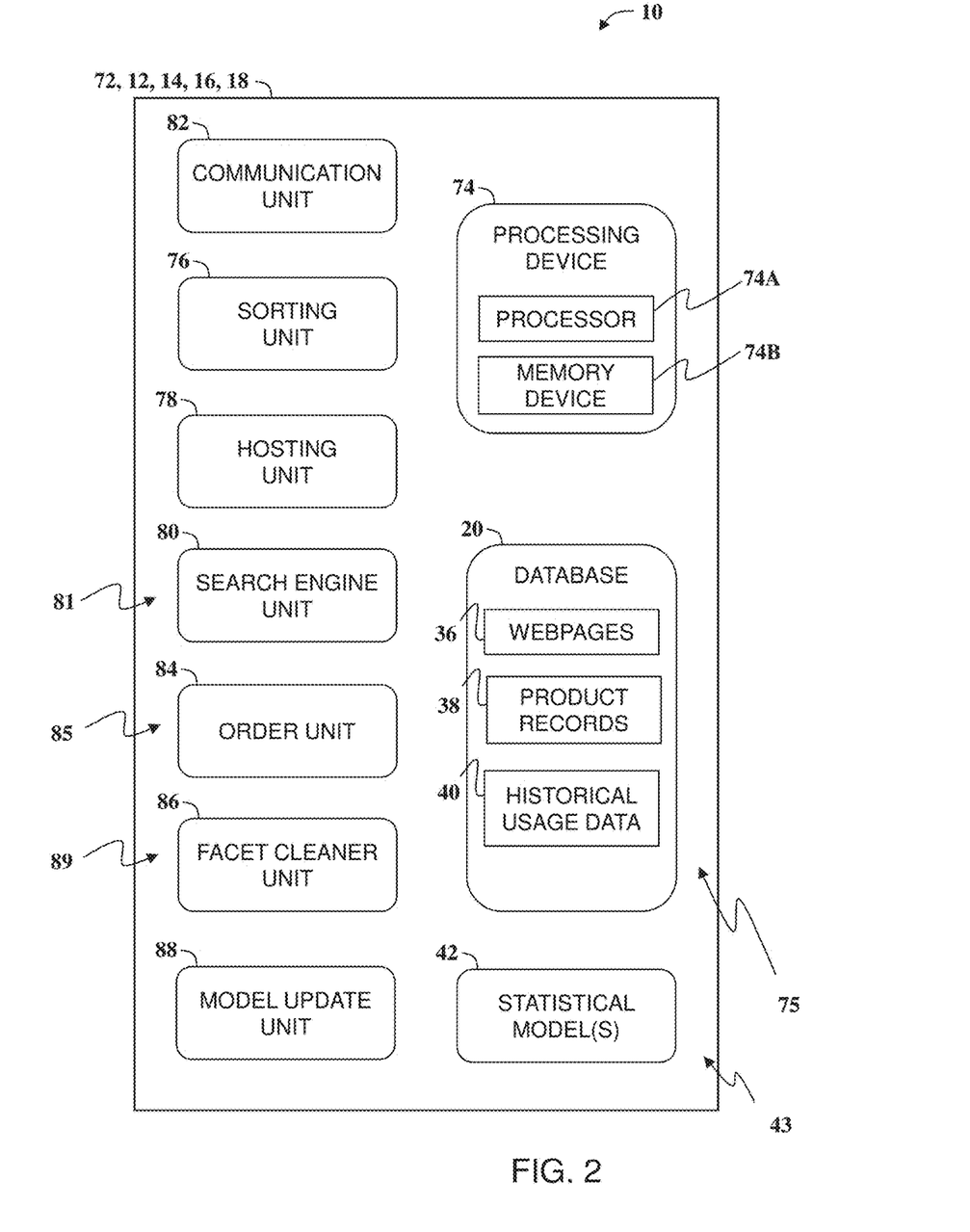
FIG. 2 is a schematic illustrating example components of a server, according to an embodiment of the present invention.

Referring to FIG. 2, in one embodiment, the system 10 may include a system server 72 that is configured to perform the functions of the hosting server 12, the search engine server 14, the sorting server 16, and the database server 18. In the illustrated embodiment, the system server 72 includes a processing device 74 and the database 20.

The processing device 74 executes various programs, and thereby controls components of the system server 72 according to user instructions received from the user computing device 22. The processing device 74 may include a processor or processors 74A and a memory device 74B, e.g., read only memory (ROM) and random access memory (RAM), storing processor-executable instructions and one or more processors that execute the processor-executable instructions. In embodiments where the processing device 74 includes two or more processors 74A, the processors 74A can operate in a parallel or distributed manner. In an example, the processing device 74 may execute a sorting unit 76, a hosting unit 78, and a search engine unit 80, a communications unit 82, an order unit 84, and a facet cleaner unit 86.

The memory device 74B may be configured to store programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications unit 82 retrieves various data and information from the database 20 and sends information to the user computing device 22 via the communications network 24 to enable the user to access and interact with the system 10. In one embodiment, the communications unit 82 displays various images on a graphical interface of the user computing device 22 preferably by using computer graphics and image data stored in the database 20 including, but not limited to, web pages, product records, sorted groups, product lists, and/or any suitable information and/or images that enable the system 10 to function as described herein.

The hosting unit 78 may be programmed to perform some or all of the functions of the hosting server 12 including hosting various web pages associated with one or more websites that are stored in the database 20 and that are accessible to the user via the user computing device 22. The hosting unit 78 may be programmed to generate and display web pages associated with a website in response to requests being received from users via corresponding web browsers.

The search engine unit 80 may be programmed to perform some or all of the functions of the search engine server 14 including generating and storing search data 36 in response to the user's product search request. In addition, the search engine unit 80 may also be programmed to generate a relevance score associated with each of the product records 38 included in the search data 36.

The sorting unit 76 may be programmed to perform some or all of the functions of the sorting server 16 including selecting a first sorting value and generating a first sorted group of product records as a function of the first sorting value, and selecting a second sorting value and generating a second sorted group as a function of the product records included in the first sorted group and the second sorting value. In addition, the sorting unit 76 may also be programmed to generate a product list as a function of the second sorted group and display the product list on a website in response to the product search request.

As discussed above, the memory device 74B is configured to store product data associated with a plurality of products. The product data may include pricing information and access information related to the plurality of products. In general, the access information provides information related to expressed customer interest in a product. For example, the access information may include, but is not limited to, (the number of) prior purchases by customers of the product, inclusion of the product in prior search results by customers, "clicks" or "click-throughs") by customers, i.e., selection of a hyper-link in the search results to access additional information about the product, and/or any combination thereof.

As discussed above, the search engine unit 80 is coupled to the memory device 74B and is configured to receive a product search request and receive, from the memory device 74B, search results data associated with the product search request. The search results data will generally include a plurality of product records. Each of the product records includes a price assigned with the associated product and other data associated with the product.

As discussed above, the memory device 74B is configured to store product data in the form of product record 38. The memory device is further configured to store historical usage information related to usage of the commercial order module by a plurality of customers and a plurality of facets associated with the plurality of products. Each facet has a plurality of facet values.

For example, the historical usage information may include product search requests and information indicating that:

a customer engaged or selected a facet value,
a customer did not engage or select a facet value,
a customer unselected a previously selected facet value,
viewed a page or product associated with a facet value, or,
a customer did not view a page or product associated with a facet value.

The historical information is used to train one or more statistical model(s). As discussed in more detail below, when a product search request has been received, initial search results are generated. The initial search results include one or more facets. Each facet includes one or more facet values. In one aspect of the present invention, the statistical models are used to evaluate each facet value to determine if the facet value is relevant to the customer's search request with a high degree of probability. If the facet value is not relevant, then the facet value may be removed.

Figure 7:
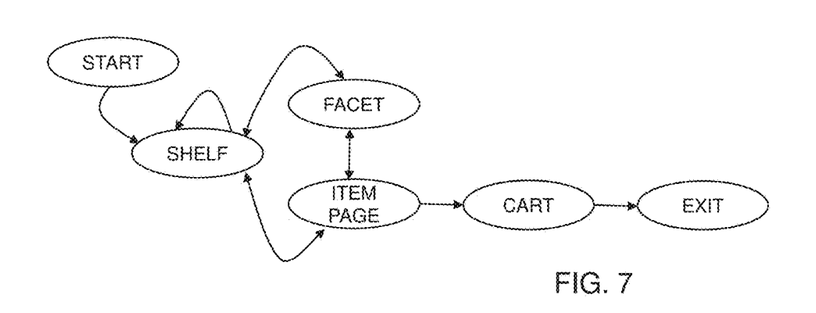
FIG. 7 is a state diagram of a customer's interaction of a commercial product module, according to an embodiment of the present invention.

With reference to FIG. 7, a simplified state chart 700 of a customer's interaction with the commercial product module 44 is shown. The customer starts by logging onto the website or app 26. Once the customer enters the commercial product module 44, the customer may be shown a page or display that includes product descriptions, a search query entry box, and additional information, e.g., on the left side, including facets and category information (see for example, FIGS. 4 and 5). This is referred to as the "SHELF" in the state diagram of FIG. 7. If the customer enters a product search query, products meeting the search query are displayed as well as category and facet and the associated facet values.

From the SHELF, the customer can either visit a PRODUCT OR ITEM page or select a FACET value. The customer can thereafter add a product to a virtual shopping cart (CART). The customer can exit the commercial product module 44 from the SHELF, FACETS, ITEM PAGE or from the CART (with or without making a purchase). A forced exit may occur after a predetermined timeout, e.g., 30 minutes. For purposes of establishing the facet removal rates and the product view rate, a session defined from START to EXIT.

In one aspect of the present invention, the at least one statistical model includes a facet removal statistical model based on the historical usage information and a product view rate statistical model based on the historical usage information. In general, the facet removal rate and the product view rate are based on the customer's engagement/selection and/or de-selection of facet values and the customer's interaction with a product or page associated with a facet value. More specifically, in one embodiment, the facet removal rate may be indicative of how many times a facet value was engaged or selected by the customer and was subsequently deselected by the customer. And the product view rate, in one specific embodiment is indicative of how many times the customer, upon engaging with a facet value, viewed a product or page associated with facet value.

In one embodiment of the present invention, the facet removal rate (FRR), for a specific facet value over a sample of customer sessions from the historical data, is determined as follows:

$$FRR = 1 - (SU_{fvp}/SU_{fve}),$$

where $SU_{fvp}$ is the total number of sessions where the facet value was present when the session unit ended, and $SU_{fve}$ is the total number of sessions where the facet value was engaged by a customer during the session. For a particular facet, $0 < FRR < 1$ and the higher value of FRR the less relevant the facet may be with respect to the product search query.

In one embodiment of the present invention, the product view rate (PVR), for a specific facet value over the sample of customer sessions from the historical data, is determined as follows:

$$PVR = SU_{pv}/SU_{fve},$$

where $SU_{pv}$ is the total number of session units where the customer engaged with the facet value and viewed at least one product page from the displayed results. For a particular facet, $0 < PVR < 1$ and the lower value of PVR the less relevant the facet may be with respect to the product search query.

The order unit 84 is coupled to the memory device 74B and the hosting unit 78 and is configured to generate the commercial product module 44. As discussed above, the commercial product module 44 may be an application or app running on the customer device or a website 28. The commercial product module 44 is sent over a computer network to, and viewable by the customer on, customer device 22. The commercial product module 44 allows the customer to enter a product search request via the commercial product module 44.

The search engine unit 80 is coupled to the memory device and the order unit 84. The search engine unit 80 is configured to receive the product search request from the order unit 84 and to receive, from the memory device 74B, search results data associated with the product search request. The (initial) search results data includes a subset of the plurality of products and at least one facet associated with the product search request.

The facet cleaner unit 88 is coupled to the memory device 74B, the order unit 84, and the search engine unit 80. The facet cleaner unit 88 is configured to receive the search results data and to filter the search results data based on the at least one statistical model to remove irrelevant facet values from the search results data and to responsively establish filtered search results data. The order unit 84 then sends the filtered search results to the commercial product module 44 over the computer network.

In one aspect of the present invention, the facet cleaner unit 86 is configured to establish a facet removal parameter and a product view rate parameter, for each facet value, as a function of the search results and the at least one statistical model. In one embodiment, the facet removal parameter is compared with a predetermined facet removal threshold and the product view rate parameter is compared with a predetermined product view rate parameter. In one embodiment, if both thresholds are exceeded then the associated facet value is removed from the search results. It should be noted that the term "exceeds" may mean that the parameter is either higher or lower. As stated above, it is noted that a low product view rate or PVR is indicative that a facet value may not be relevant. Thus, for PVR, as defined above, the product view rate parameter exceeds the predetermined threshold if the product view rate parameter is less than the threshold.

In another aspect of the present invention, the facet cleaner unit 86 is configured to block removal of a facet that has been recently fixed. As discussed, above the statistical models are based on historical data. In one embodiment, once a facet value has been removed, a report may be generated. The report may include a list of the facet values that have been reviewed and the search query and/or search results. The report may be (manually) evaluated such that the issue or problems that resulted in the irrelevant search results may be fixed. The facet cleaner unit 86 may be further configured to receive an indication that the issues have been fixed and that the associated facet value should not be suppressed. Thus, even if, based on the at least one statistical model, a facet value is not relevant, if the facet cleaner unit 86 has received such an indication, that the removal of the facet value may be blocked.

In another aspect of the present invention, the facet cleaner unit 86 may be further configured to randomly include one or more removed facet values and display the facet values on the commercial product module. Usage of the randomly included removed facet value may be used to update the statistical models. Use of this process may be used to determine if the issues or problems that led to irrelevant data being utilized have been fixed.

In another aspect of the present invention, the system 10 includes a model update unit 88 coupled to the search engine unit 80 and the order unit 84. The model update unit is configured to monitor customer usage of the commercial product module 44 and to responsively update the at least one statistical model.

In one embodiment of the present invention, the memory device may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

Figure 3:
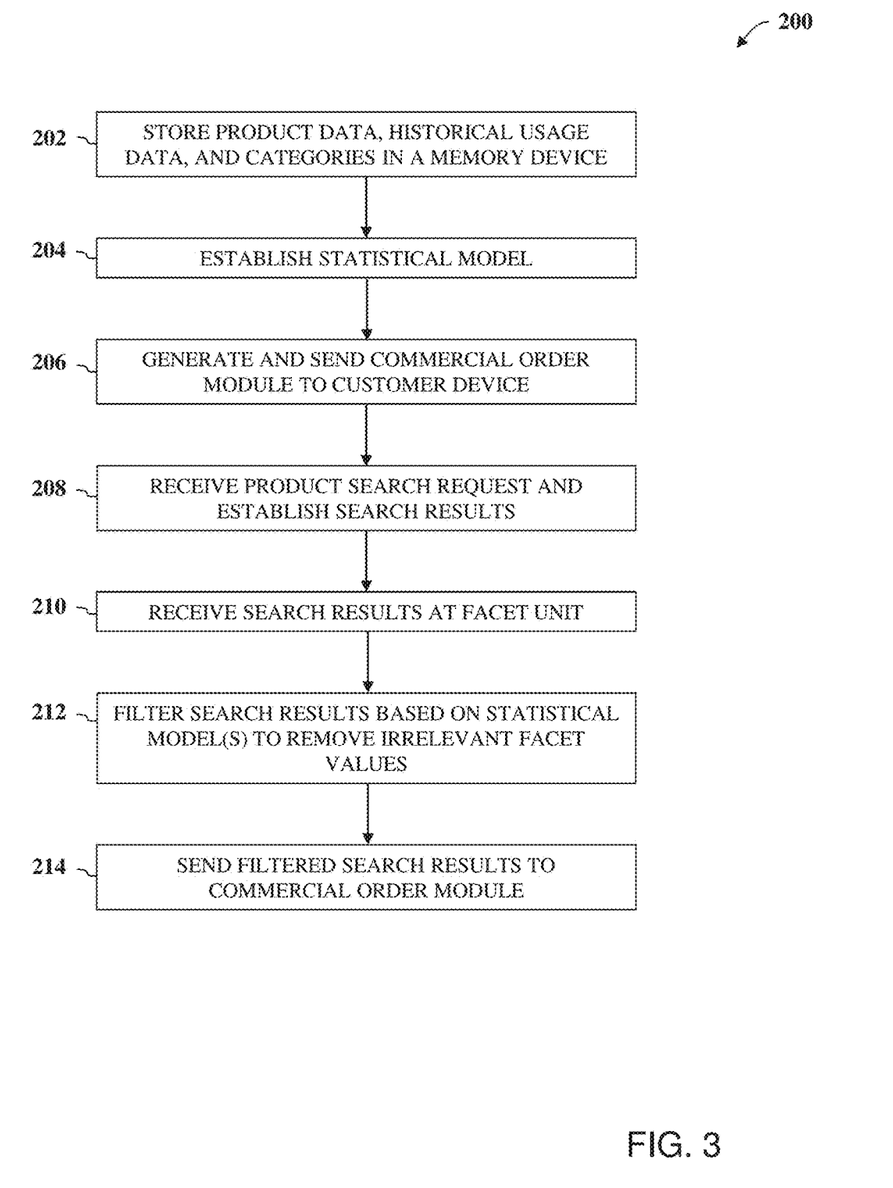
FIG. 3 is a flowchart of a method that may be used with the system shown in FIG. 1, according to an embodiment of the present invention.

FIG. 3 is a flowchart of method 200 that may be used with the system 10 for displaying product information on a commercial product module, such as an app or website. The method includes a plurality of steps. Each method step may be performed independently of, or in combination with, other method steps. Portions of the method may be performed by any one of, or any combination of, the components of the system 10.

In a first step 202, product data, historical usage data, and categories (or facets) are stored in the memory device 74B. In a second step, 204, the statistical model(s) are established using the historical usage data. In a third step 206, the commercial order module 44, e.g., a website or app, are generated and sent to a customer device 22.

Using the commercial order module 44, the customer can enter a product search request in a fourth step 208. The product search request is received at the facet unit (fifth step 210) and the search results are filtered based on the statistical model(s) to remove irrelevant facet values (sixth step 212). In a seventh step 214, the filtered search results are sent to the commercial order module 44.

Returning to FIG. 2, in still a further embodiment of the present invention, the system 10 may include a memory means 75, modeling means 43, order means 85, search engine means 81, and facet cleaner means 89 is provided.

The memory means 75 may include, but is not limited to the memory device 74 and database 20. The memory means 75 may be implemented via read only memory (ROM) and random access memory (RAM), a hard disc drive, a solid state drive (or hybrid thereof), an optical disc drive, and/or a flash memory drive. Further, the memory means 75 may be distributed and located at multiple locations. The memory means 75 performs the functions of storing product data associated with a plurality of products, storing historical usage information related to usage of a commercial order module by a plurality of customers, and storing a plurality of facets associated with the plurality of product. Each facet has a plurality of facet values.

The modeling means 43 may be implemented, at least in part, by the processing device 74, including the processor or processors 74A and the memory device 74B. The modeling means 43 performs the functions of: providing at least one statistical model established as a function of the historical usage information.

The order means 85 may be implemented, at least in part, by the processing device 74, including the processor or processors 74A and the memory device 74B. The order means 85 performs the functions of generating the commercial product module and allowing the customer to enter a product search request via the commercial product module.

The search engine means 81 may be implemented, at least in part, by the processing device 74, including the processor or processors 74A and the memory device 74B. The search engine means 81 performs the functions of receiving the product search request from the order unit and receiving search results data associated with the product search request. The search results data includes a subset of the plurality of products and at least one facet associated with the product search request.

The facet cleaner means 89 may be implemented, at least in part, by the processing device 74, including the processor or processors 74A and the memory device 74B. The facet cleaner 89 performs the function of receiving the search results data, filtering the search results data based on the at least one statistical model to remove irrelevant facet values from the search results data and responsively establishing filtered search results data. The order means 85 includes means for sending the filtered search results data to the commercial product module over the computer network.

INDUSTRIAL APPLICABILITY

The present invention is aimed at systems and method that generate product search results as a function of customer input product search queries. The product search results may include facets or categories that include facet values that may be used by the customer to filter the search results to obtain products that are relevant to the customer. In use, the present invention may be used to automatically identify the facet values that are causing irrelevant products being shown in the search results resulting in "bad" customer experience. Such facet values may thereafter be suppressed. The system is fully data driven and automatically identifies the facet values that are causing bad customer experience.

Below, a detailed embodiment of the present invention embodied in a system is described. In general, this embodiment uses a randomization scheme to suppress such facet values, showing them occasionally to gather recent data on whether or not the facet values have improved. The filtering of facet values (through a suppression layer) works as a robust noise filtration on top of the search and browse page faceting experience.

Facets are used to quickly navigate through the results from search and browse. However, delivering a good customer experience through facets present several problems. First the process relies on several components of the underlying system, such as search ranking, classifying items into shelves, item attribute tagging, editorial review, and crowd sourcing to function well. As a result of this complexity, There are several instances where applying a facet value for a browse path or search query lead to results that are unexpected and may lead to bad customer experience and bad reputation for seller or retailer.

The present invention provides for an automatic audit of hundreds of facet values for thousands of shelves and millions of queries to identify where the experience is broken. Once identified, these issues need to be channeled to appropriate teams for necessary correction. The process of correcting the issues resulting in irrelevant results is a time taking exercise. Thus, Bad facet values need to be suppressed and then re-introduced when the underlying issues have been fixed.

In this detailed embodiment, a fully data driven approach to automatically identify the facet values that are causing bad customer experience. In this embodiment, a randomization scheme is used to suppress such facet values, showing them every once in a while to gather recent data on whether or not the facet values have improved. In general, the detailed embodiment uses a framework consisting of the following components:

1. Computing customer metrics that are indicative of facet values causing bad experience by analyzing the sequences of related activities of each customer.
2. A decision function to identify which facet values are bad based on the above metrics.
3. A Bayesian model based randomization scheme to suppress bad facet values identified above and updating the model based on the response.

Each of the above three steps are described next along with some implementation details.

In the detailed embodiment, session unit based analysis is used to establish various customer centric metrics around the performance of facet values for a query or a shelf. The two metrics used to identify facet values that cause bad customer experience are Facet Removal Rate (FRR) and Product View Rate (PVR). Customer sessions, FRR, and PVR are defined above.

In this embodiment, high FRR and low PVR are indicative of facets causing bad customer experience. In a first embodiment, a simple threshold based strategy is used, where $T_f$ and $T_p$ are predetermined thresholds for FRR and PVR, respectively, where $0<T_f<1$ and $0<T_p<1$.

For a given query or shelf, a facet value is considered bad if $FRR>T_f$ with high probability and $PVR<T_p$ with high probability. FRR and PVR may be evaluated by obtaining Binomial proportion confidence intervals for FRR and PVR, comparing the lower end of FRR and the upper end of the PVR with their respective thresholds.

In this embodiment both FRR and PVR are evaluated to identify bad facet values. Using only one of these. While either FRR or PVR may be used to identify bad facets with good precision, in some cases, customers try various facet values to explore the results and remove the facet values after checking out the items. This may lead to high FRR. Additionally, there are cases where the assortment is fairly standard but fails to please customers, and customers do not feel the need to click on the items; this leads to low PVR. Using thresholds for both FRR and PVR addresses some of the above problems.

In this evaluation $T_p=0.1$ and $Tf \in [0.3; 0.4]$ appear to identify bad facets with good precision. Table 1 shows the results for evaluating 395 query and facet values for sample search data we identified using $T_p=0.1$ and $T_f=0.4$. The facet values with scores $\{-2; -1; 0\}$ are candidates for suppression. The average rating on this dataset was 0.97 indicating a strong performance in identifying bad facet.

TABLE 1

Editorial evaluation of results shows for queries and facet values for search.

| Query and facet value result quality | Frequency |
| --- | --- |
| −2 (Embarrassing) | 118 (29.9%) |
| −1 (bad) | 138 (34.9%) |
| 0 (Neutral) | 95 (24.1%) |
| +1 (Good) | 10 (2.5%) |
| +2 (Excellent) | 4 (1.0%) |
| No longer valid | 30 (7.6%) |

In one aspect of the present invention, statistical models are established for each query (or shelf), facet, and facet value. For purposes of discussion, the following discussion focuses on the model for facet value. Two different randomization schemes are discussed below that are used to automatically suppress bad facet values with high probability, but also to reintroduce the suppressed facet values with a small probability to gather recent data about the performance of the reintroduced facet values. The model keeps updating its belief about whether or not a facet value is bad based on the data gathered when the facet value is shown.

First Randomization Scheme

In the first randomization scheme, for each facet value, FRR and PVR are each modeled using Beta random variables. Let FRR~Beta($\alpha_f$, $\beta_f$) and PVR Beta($\alpha_p$, $\beta_p$). The parameters a's and β's are computed by training the model on an initial dataset (e.g., 90 days). For each facet value, a realization of its FRR and PVR are sampled by independent draws from their Beta distribution. The realized samples are compared to the thresholds $T_f$ and $T_p$ to determine if the facet value should be included.

For the facet values that are shown, the model is updated as follows:

$\alpha_f \leftarrow \delta\alpha_f$+number of session units where the facet value was removed; (1)

$\beta_f \leftarrow \delta\beta_f$+number of session units where the facet value survived; (2)

$\alpha_p \leftarrow \delta\alpha_p$+number of session units where the facet value resulted in a product view; (3)

$\beta_p \leftarrow \delta\beta_p$+number of session units where the facet value did not result in a product view. (4)

Here $0 < \delta \leq 1$ is a decay factor which controls how quickly history should be forgotten. For the facet values that are suppressed, the model is updated as follows:

$\alpha_f \leftarrow \delta\alpha_f, \beta_f \leftarrow \delta\beta_f, \alpha_p \leftarrow \delta\alpha_p, \beta_p \leftarrow \delta\beta_p$.

The above process is repeated periodically, for example, daily. Drawing random samples from Bayesian posterior to decide whether or not to show a facet value and updating the model based on the response ensures that the facet values for which we have high confidence that FRR is large and PVR is low are suppressed, at the same time the suppressed facet value(s) will be shown periodically to gather new performance data.

Second Randomization Scheme

As in the first randomization scheme, in the second randomization scheme, for each facet value, FRR and PVR are modeled by Beta random variables, with the same notation. Here, the first set of facet values that are candidate for suppression are identified using the decision rules discussed above. Let S be the set of facet values for which FRR>$T_f$ with high probability, e.g., 0.95, and PVR<$T_p$ with high probability, where the probabilities are evaluated using the corresponding Beta distribution parameters. Given sampling probability $0<\gamma<1$, e.g., 0.9, the facet values that should be suppressed, $S_\gamma$ are selected from S. This randomization allows for a small set of facet values to still show on the website even though they are in the eligible set for removal.

For each facet value that is not in the candidate set, $S_\gamma$, for suppression, the model is updated according to equations (1)-(4) above. The facet values in the set $S_\gamma$ are not updated.

The above randomization scheme provides the ability to identify the facet values that have been fixed automatically and quickly. The idea here is to compare the recent most performance data of the facet values that were shown to the customers with what the models for PVR and FRR predict based on the past historical data. A previously identified bad facet value that was randomly chosen to be shown to the customer may still show low PVR and high FRR on the recent data. However, if this is not the case, i.e., a previously identified bad facet value indicates high PVR and low FRR on the day when it was randomly shown to the customer, it indicates that the facet value has been fixed recently. In order to identify such cases with high confidence and reduce noise in the inference, statistical significance tests are used to check how unlikely the recent performance is assuming that models for PVR and FRR based on historical data is true. Facet values identified using this approach are not suppressed for the next day; this allows the detection if some facet values have been fixed by gathering more data quickly. Finally, external signal or manual white list that indicate explicitly which facet values have been fixed may be ingested.

To detect with high confidence the facet values recently fixed, a Bayesian posterior p-value check may be used. Let n be the number of times a facet value in $S/S_\gamma$ is engaged, $m_r$ be the number of times the facet value is removed, and $m_p$ be the number of times the facet value leads to product views. Given the current estimate of α's and β's for FRR and PVR, the probability of observing at most $m_r$ removal out of n trials and the probability of observing at least $m_t$ product views out of n.1 If any of these tail probabilities is small, e.g., 0.05, this indicates that the current performance is different from the model in the direction of being a facet value. In this case, this facet value is marked such that it is not be suppressed the next day. The model parameters may then be updated as above.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system, comprising:
   a memory device configured to store product data associated with a plurality of products, to store historical usage information related to usage of a commercial product module by a plurality of customers, and to store a plurality of facets associated with the plurality of products, each facet having a plurality of facet values;
   at least one statistical model established as a function of the historical usage information;
   an order system coupled to the memory device and being configured to send the commercial product module over a computer network to, and viewable by a customer on, a customer device and to allow the customer to enter a product search request via the commercial product module;
   a search engine coupled to the memory device and the order system and being configured to receive the product search request from the order system, and to receive, from the memory device, search results data associated with the product search request, the search results data including a subset of the plurality of products and at least one facet of the plurality of facets associated with the product search request;
   a facet cleaner being configured to establish a facet removal rate and a product view rate for each facet value of the plurality of facet values as a function of the search results data and the at least one statistical model; and
   the facet cleaner coupled to the memory device, the order system, and the search engine and configured to receive the search results data, to filter the search results data based on the at least one statistical model to remove facet values of the plurality of facet values that are not relevant to the product search request from the search results data, and to responsively establish the search results data, as filtered, wherein the order system is further configured to send the search results data, as filtered, to the commercial product module over the computer network.

2. The system, set forth in claim 1, wherein the facet removal rate further comprises a number of times a particular facet value of the plurality of facet values is selected or de-selected on a product page associated with the particular facet value.

3. The system, as set forth in claim 1, wherein the at least one statistical model includes a facet removal statistical model based on the historical usage information and a product view rate statistical model based on the historical usage information.

4. The system, as set forth in claim 3, further comprising the facet cleaner being configured to establish a facet removal parameter associated with each facet value of the at least one facet as a function of the product search request, the at least one facet, and the facet removal statistical model, and to establish a product view rate parameter associated with each facet value of the at least one facet as a function of the product search request, the at least one facet, and the product view rate statistical model, and to remove any facet value from the at least one facet when the facet removal parameter associated with the any facet value exceeds a predetermined facet removal threshold and when the product view rate parameter associated with the any facet value exceeds a predetermined product view rate threshold.

5. The system, as set forth in claim 3, wherein the facet cleaner is configured to block removal of a facet of the plurality of facets that has been fixed.

6. The system, as set forth in claim 3, wherein one or more facet values of the plurality of facet values, as removed, are randomly included and displayed on the commercial product module.

7. The system, as set forth in claim 6, wherein usage on the one or more facet values, as randomly included, is used to update the facet removal statistical model and the product view rate statistical model.

8. The system, as set forth in claim 3, wherein the facet removal statistical model and the product view rate statistical model are probabilities distribution curves.

9. The system, as set forth in claim 8, wherein the facet removal statistical model and the product view rate statistical model are established using Bayesian analytical methods.

10. The system, as set forth in claim 1, further comprising a model update coupled to the search engine and the order system and being configured to monitor customer usage of the commercial product module and to responsively update the at least one statistical model.

11. The system, as set forth in claim 1, wherein the commercial product module is a website.

12. The system, as set forth in claim 1, wherein the commercial product module is an application running on the customer device.

13. A method being implemented via execution of computing instructions configured to run at one or more processors and stored at one or more non-transitory computer-readable media, the method comprising:

storing, on a memory device, product data associated with a plurality of products, historical usage information related to usage of a commercial product module by a plurality of customers, and a plurality of facets associated with the plurality of products, each facet having a plurality of facet values;

establishing at least one statistical model as a function of the historical usage information; sending the commercial product module over a computer network to a customer device, the commercial product module being viewable by a customer and configured to allow the customer to enter a product search request via the commercial product module;

receiving the product search request, at a search engine, and receiving from the memory device, search results data associated with the product search request, the search results data including a subset of the plurality of products and at least one facet of the plurality of facets associated with the product search request;

determining a facet cleaner being configured to establish a facet removal rate and a product view rate for each facet value of the plurality of facet values as a function of the search results data and the at least one statistical model;

receiving the search results data, at the facet cleaner coupled to the memory device, an order system, and the search engine and filtering the search results data based on the at least one statistical model to remove facet values of the plurality of facet values that are not relevant to the product search request from the search results data, and responsively establishing the search results data, as filtered; and sending the search results data, as filtered, to the commercial product module over the computer network.

14. The method, set forth in claim 13, wherein the facet removal rate further comprises a number of times a particular facet value of the plurality of facet values is selected or de-selected on a product page associated with the particular facet value.

15. The method, as set forth in claim 13, wherein the at least one statistical model includes a facet removal statistical model based on the historical usage information and a product view rate statistical model based on the historical usage information.

16. The method, as set forth in claim 15, further comprises:

establishing a facet removal parameter associated with each facet value of the at least one facet as a function of the product search request, the at least one facet, and the facet removal statistical model;

establishing a product view rate parameter associated with each facet value of the at least one facet as a function of the product search request, the at least one facet, and the product view rate statistical model;

removing any facet value from the at least one facet when the facet removal parameter associated with the any facet value exceeds a predetermined facet removal threshold and when the product view rate parameter associated with the any facet value exceeds a predetermined product view rate threshold.

17. The method, as set forth in claim 16, further comprising blocking removal of a facet that has been fixed.

18. The method, as set forth in claim 16, further comprising randomly including one or more facet values of the plurality of facet values, as removed, and displaying the randomly included the one or more facet values of the plurality of facet values, as removed, on the commercial product module.

19. The method, as set forth in claim 18, further comprising updating the facet removal statistical model and the product view rate statistical model as a function of usage of the randomly included the one or more facet values.

20. The method, as set forth in claim 16, wherein the facet removal statistical model and the product view rate statistical model are probabilities distribution curves.

21. The method, as set forth in claim 20, wherein the facet removal statistical model and the product view rate statistical model are established using Bayesian analytical methods.

22. The method, as set forth in claim 13, further comprising monitoring customer usage of the commercial product module and responsively updating the at least one statistical model.

23. The method, as set forth in claim 13, wherein the commercial product module is a website.

24. The method, as set forth in claim 13, wherein the commercial product module is an application running on the customer device.

25. A system, comprising:

memory means for storing product data associated with a plurality of products, for storing historical usage information related to usage of a commercial product module by a plurality of customers, and for storing a plurality of facets associated with the plurality of products, each facet having a plurality of facet values;

modeling means for providing at least one statistical model established as a function of the historical usage information;

order means, coupled to the memory means, for sending the commercial product module over a computer network to, and viewable by a customer on, a customer device, the order means for allowing the customer to enter a product search request via the commercial product module;

search engine means, coupled to the memory means and the order means, for receiving the product search request from an order system and for receiving, from the memory means, search results data associated with the product search request, the search results data including a subset of the plurality of products and at least one facet of the plurality of facets associated with the product search request;

facet cleaner means being configured to establish a facet removal rate and a product view rate for each facet value of the plurality of facet values as a function of the search results data and the at least one statistical model; and the facet cleaner means coupled to the memory means, the order means, and the search engine means, for receiving the search results data, for filtering the search results data based on the at least one statistical model to remove facet values of the plurality of facet values that are not relevant to the product search request from the search results data, and for responsively establishing the search results data, as filtered, wherein the order means includes means for sending the search results data, as filtered, to the commercial product module over the computer network.

26. One or more non-transitory computer-readable storage media, having computer-executable instructions embodied thereon, wherein when executed by at least one processor, the computer-executable instructions cause the at least one processor to operate as:
- a memory device configured to store product data associated with a plurality of products, to store historical usage information related to usage of a commercial product module by a plurality of customers, and to store a plurality of facets associated with the plurality of products, each facet having a plurality of facet values;
- at least one statistical model established as a function of the historical usage information;
- an order system coupled to the memory device and being configured to send the commercial product module over a computer network to, and viewable by a customer on, a customer device and to allow the customer to enter a product search request via the commercial product module;
- a search engine coupled to the memory device and the order system and being configured to receive the product search request from the order system, and to receive, from the memory device, search results data associated with the product search request, the search results data including a subset of the plurality of products and at least one facet of the plurality of facets associated with the product search request;
- a facet cleaner being configured to establish a facet removal rate and a product view rate for each facet value of the plurality of facet values as a function of the search results data and the at least one statistical model; and
- the facet cleaner coupled to the memory device, the order system, and the search engine and configured to receive the search results data and to filter the search results data based on the at least one statistical model to remove facet values of the plurality of facet values that are not relevant to the product search request from the search results data, and to responsively establish the search results data, as filtered, wherein the order system is further configured to send the search results data, as filtered, to the commercial product module over the computer network.

* * * * *